United States Patent
Lee et al.

(10) Patent No.: US 12,200,560 B2
(45) Date of Patent: Jan. 14, 2025

(54) TECHNIQUES FOR DUAL CONNECTIVITY MODE OPTIMIZATION

(71) Applicant: QUALCOMM Incorporated, San Diego, CA (US)

(72) Inventors: Kuo-Chun Lee, San Diego, CA (US); Arvind Vardarajan Santhanam, San Diego, CA (US); Vishal Dalmiya, San Diego, CA (US); Subashini Krishnamurthy, San Diego, CA (US); Sasikanth Reddy Adapala, Poway, CA (US); Yiming Xu, San Diego, CA (US); Daniel Amerga, San Diego, CA (US); Krishna Billuri, San Diego, CA (US); Leena Zacharias, San Jose, CA (US); Satashu Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/303,352

(22) Filed: May 27, 2021

(65) Prior Publication Data
US 2021/0377823 A1    Dec. 2, 2021

Related U.S. Application Data

(60) Provisional application No. 63/032,154, filed on May 29, 2020.

(51) Int. Cl.
*H04W 36/24* (2009.01)
*H04W 36/00* (2009.01)
(Continued)

(52) U.S. Cl.
CPC ... *H04W 36/249* (2023.05); *H04W 36/00698* (2023.05); *H04W 76/15* (2018.02);
(Continued)

(58) Field of Classification Search
CPC . H04W 76/15; H04W 88/06; H04W 36/0069; H04W 72/0453; H04W 76/34;
(Continued)

(56) References Cited

U.S. PATENT DOCUMENTS

2020/0077385 A1   3/2020   Van Der Velde et al.
2020/0137819 A1   4/2020   Shi et al.
(Continued)

FOREIGN PATENT DOCUMENTS

EP   2945423 A1   11/2015
EP   3041310 A1   7/2016
(Continued)

OTHER PUBLICATIONS

International Search Report and Written Opinion—PCT/US2021/070636—ISA/EPO—Aug. 24, 2021.

*Primary Examiner* — Nam T Huynh
(74) *Attorney, Agent, or Firm* — Dalei Dong; Harrity & Harrity, LLP (57) ABSTRACT

Various aspects of the present disclosure generally relate to wireless communication. In some aspects, a user equipment (UE) may measure a parameter associated with a secondary cell group. The UE may perform an optimization response action for a dual connectivity mode of a first frequency parameter or a second frequency parameter when the parameter satisfies a threshold, wherein the optimization response action is associated with whether the secondary cell group is operating with the first frequency parameter or the second frequency parameter. Numerous other aspects are described.

34 Claims, 5 Drawing Sheets

(51) Int. Cl.
*H04W 76/15* (2018.01)
*H04W 76/34* (2018.01)
*H04W 88/06* (2009.01)
*H04W 76/30* (2018.01)

(52) U.S. Cl.
CPC ........... *H04W 76/34* (2018.02); *H04W 88/06* (2013.01); *H04W 76/30* (2018.02)

(58) Field of Classification Search
CPC ....... H04W 36/00698; H04W 52/0261; H04W 76/30
See application file for complete search history.

(56) References Cited

U.S. PATENT DOCUMENTS

| | | | | |
|---|---|---|---|---|
| 2021/0022073 | A1* | 1/2021 | Kwok | H04W 72/085 |
| 2021/0211972 | A1* | 7/2021 | Zhang | H04W 24/10 |
| 2022/0046546 | A1* | 2/2022 | Wang | H04W 28/0278 |
| 2022/0159569 | A1* | 5/2022 | Yuan | H04W 52/0216 |

FOREIGN PATENT DOCUMENTS

| | | | |
|---|---|---|---|
| EP | 3410816 A1 | | 12/2018 |
| WO | WO-2021169998 A1 | * | 9/2021 |

\* cited by examiner

TECHNIQUES FOR DUAL CONNECTIVITY MODE OPTIMIZATION

CROSS-REFERENCE TO RELATED APPLICATION

This Patent Application claims priority to U.S. Provisional Patent Application No. 63/032,154, filed on May 29, 2020, entitled "TECHNIQUES FOR DUAL CONNECTIVITY MODE OPTIMIZATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dual connectivity mode optimization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes measuring a parameter associated with a secondary cell group; and performing an optimization response action for a dual connectivity mode of a first frequency parameter or a second frequency parameter when the parameter satisfies a threshold, wherein the optimization response action is associated with whether the secondary cell group is operating with the first frequency parameter or the second frequency parameter.

In some aspects, the method includes determining whether the secondary cell group operates with the first frequency parameter or the second frequency parameter, wherein the frequency parameter is a frequency band or a frequency range. In some aspects, a characteristic of the parameter or the threshold is associated with whether the secondary cell group operates with the first frequency parameter or the second frequency parameter. In some aspects, the parameter is an average throughput, and wherein the characteristic of the parameter or the threshold is at least one of: a sampling time of the average throughput, a filter constant applied to the average throughput, or a magnitude of the threshold. In some aspects, the optimization response action includes at least one of: refraining from transmission of measurement reporting, fading a primary secondary cell dual connectivity mode add procedure, releasing a secondary cell, or transmitting a secondary cell failure information message. In some aspects, the parameter is a UE utilization parameter relating to whether a display of the UE is turned on.

In some aspects, the dual connectivity mode is an Evolved Universal Mobile Telecommunications System Terrestrial Radio Access (E-UTRA)-New Radio (NR) dual connectivity (ENDC) mode. In some aspects, a type of the optimization response action is associated with a number or type of other optimization response actions performed within a period of time or connection time. In some aspects, the first frequency parameter is a first frequency range in a sub 6 gigahertz (GHz) frequency range and the second frequency parameter is in a frequency range in a millimeter wave frequency range. In some aspects, the dual connectivity mode is a New Radio (NR) dual connectivity (NRDC) mode.

In some aspects, a UE for wireless communication includes a memory; and one or more processors, coupled to the memory, configured to: measure a parameter associated with a secondary cell group; and perform an optimization response action for a dual connectivity mode of a first frequency parameter or a second frequency parameter when the parameter satisfies a threshold, wherein the optimization response action is associated with whether the secondary cell group is operating with the first frequency parameter or the second frequency parameter.

In some aspects, the one or more processors are further configured to: determine whether the secondary cell group operates with the first frequency parameter or the second frequency parameter, wherein the frequency parameter is a frequency band or a frequency range. In some aspects, a characteristic of the parameter or the threshold is associated with whether the secondary cell group operates with the first frequency parameter or the second frequency parameter. In some aspects, the parameter is an average throughput, and wherein the characteristic of the parameter or the threshold is at least one of: a sampling time of the average throughput, a filter constant applied to the average throughput, or a magnitude of the threshold. In some aspects, the optimization response action includes at least one of: refraining from transmission of measurement reporting, failing a primary secondary cell dual connectivity mode add procedure, releasing a secondary cell, or transmit a secondary cell failure information message.

In some aspects, the parameter is a UE utilization parameter relating to whether a display of the UE is turned on. In some aspects, the dual connectivity mode is an ENDC mode. In some aspects, a type of the optimization response action is associated with a number or type of other optimization response actions performed within a period of time or connection time. In some aspects, the first frequency parameter is a first frequency range in a sub 6 GHz frequency range and the second frequency parameter is in a frequency range in a millimeter wave frequency range. In some aspects, the dual connectivity mode is an NRDC mode.

In some aspects, a non-transitory computer-readable medium storing a set of instructions for wireless communication includes one or more instructions that, when executed by one or more processors of a UE, cause the UE to: measure a parameter associated with a secondary cell group; and perform an optimization response action for a dual connectivity mode of a first frequency parameter or a second frequency parameter when the parameter satisfies a threshold, wherein the optimization response action is associated with whether the secondary cell group is operating with the first frequency parameter or the second frequency parameter.

In some aspects, the one or more instructions further cause the UE to: determine whether the secondary cell group operates with the first frequency parameter or the second frequency parameter, wherein the frequency parameter is a frequency band or a frequency range. In some aspects, a characteristic of the parameter or the threshold is associated with whether the secondary cell group operates with the first frequency parameter or the second frequency parameter. In some aspects, the parameter is an average throughput, and wherein the characteristic of the parameter or the threshold is at least one of: a sampling time of the average throughput, a filter constant applied to the average throughput, or a magnitude of the threshold. In some aspects, the optimization response action includes at least one of: refraining from transmission of measurement reporting, failing a primary secondary cell dual connectivity mode add procedure, releasing a secondary cell, or transmitting a secondary cell failure information message. In some aspects, the parameter is a UE utilization parameter relating to whether a display of the UE is turned on.

In some aspects, an apparatus for wireless communication includes means for measuring a parameter associated with a secondary cell group; and means for performing an optimization response action for a dual connectivity mode of a first frequency parameter or a second frequency parameter when the parameter satisfies a threshold, wherein the optimization response action is associated with whether the secondary cell group is operating with the first frequency parameter or the second frequency parameter.

In some aspects, the apparatus includes means for determining whether the secondary cell group operates with the first frequency parameter or the second frequency parameter, wherein the frequency parameter is a frequency band or a frequency range. In some aspects, a characteristic of the parameter or the threshold is associated with whether the secondary cell group operates with the first frequency parameter or the second frequency parameter. In some aspects, the parameter is an average throughput, and wherein the characteristic of the parameter or the threshold is at least one of: a sampling time of the average throughput, a filter constant applied to the average throughput, or a magnitude of the threshold.

In some aspects, a method of wireless communication performed by a UE includes determining whether the secondary cell group operates in a first frequency band or a second frequency band; determining whether a parameter associated with the secondary cell group satisfies a threshold, wherein a characteristic of the parameter or the threshold is based at least in part on the determination of whether the secondary cell group operates in the first frequency band or the second frequency band, and performing an optimization response action for a dual connectivity mode of the first frequency band or the second frequency band based at least in part on the determination that the parameter satisfies the threshold, wherein the optimization response action is selected based at least in part on the determination of whether the secondary cell group is operating in the first frequency band or the second frequency band.

In some aspects, a UE for wireless communication includes a memory and one or more processors coupled to the memory, the memory and the one or more processors configured to: determine whether the secondary cell group operates in a first frequency band or a second frequency band; determine whether a parameter associated with the secondary cell group satisfies a threshold, wherein a characteristic of the parameter or the threshold is based at least in part on the determination of whether the secondary cell group operates in the first frequency band or the second frequency band; and perform an optimization response action for a dual connectivity mode of the first frequency band or the second frequency band based at least in part on the determination that the parameter satisfies the threshold, wherein the optimization response action is selected based at least in part on the determination of whether the secondary cell group is operating in the first frequency band or the second frequency band.

In some aspects, a non-transitory computer-readable medium storing one or more instructions for wireless communication includes one or more instructions that, when executed by one or more processors of a UE, cause the one or more processors to: determine whether the secondary cell group operates in a first frequency band or a second frequency band; determine whether a parameter associated with the secondary cell group satisfies a threshold, wherein a characteristic of the parameter or the threshold is based at least in part on the determination of whether the secondary cell group operates in the first frequency band or the second frequency band; and perform an optimization response action for a dual connectivity mode of the first frequency band or the second frequency band based at least in part on the determination that the parameter satisfies the threshold, wherein the optimization response action is selected based at least in part on the determination of whether the secondary cell group is operating in the first frequency band or the second frequency band.

In some aspects, an apparatus for wireless communication includes means for determining whether the secondary cell group operates in a first frequency band or a second frequency band; means for determining whether a parameter associated with the secondary cell group satisfies a threshold, wherein a characteristic of the parameter or the threshold is based at least in part on the determination of whether the secondary cell group operates in the first frequency band or the second frequency band; and means for performing an optimization response action for a dual connectivity mode of the first frequency band or the second frequency band based at least in part on the determination that the parameter satisfies the threshold, wherein the optimization response action is selected based at least in part on the determination of whether the secondary cell group is operating in the first frequency band or the second frequency band.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
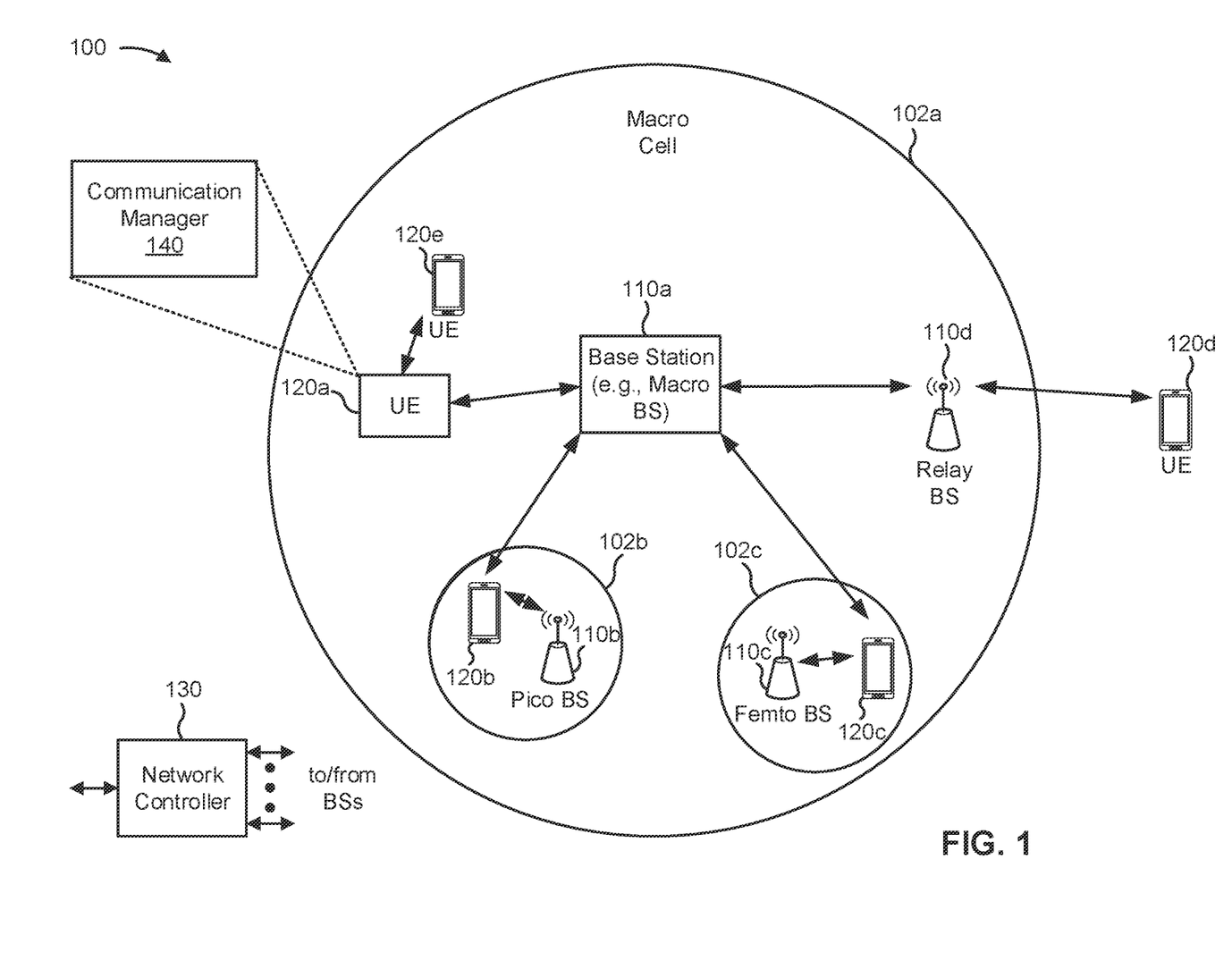
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR 1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a UE 120 may include a communication manager 140. As described in more detail elsewhere herein, the communication manager 140 may measure a parameter associated with a secondary cell group; and perform an optimization response action for a dual connectivity mode of a first frequency parameter or a second frequency parameter when the parameter satisfies a threshold, wherein the optimization response action is associated with whether the secondary cell group is operating with the first frequency parameter or the second frequency parameter. Additionally, or alternatively, the communication manager 140 may perform one or more other operations described herein.

As indicated above, FIG. 1 is provided as an example. Other examples may differ from what is described with regard to FIG. 1.

Figure 2:
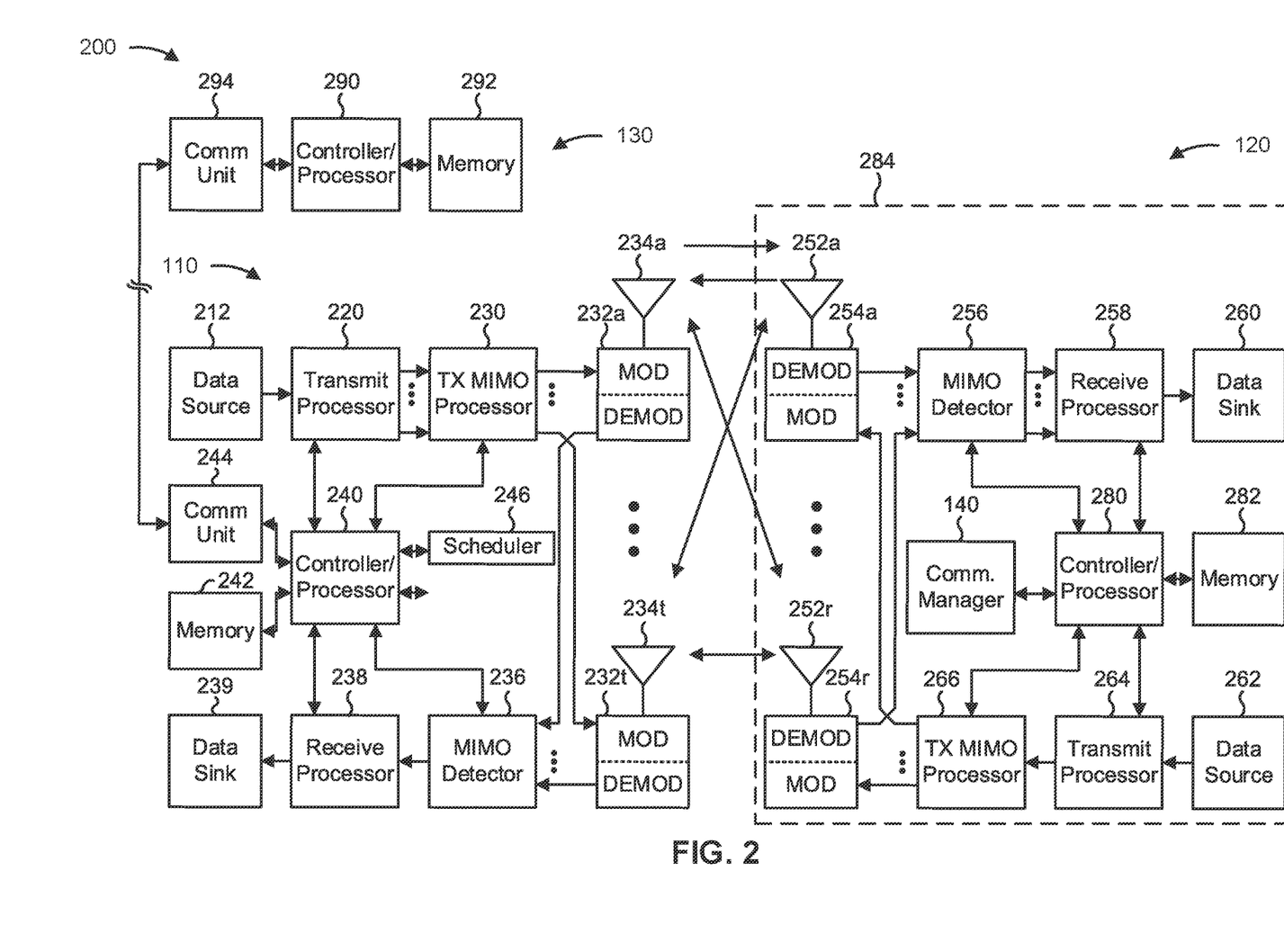
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIG. 34).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-4).

Controller/processor 240 of base station 110, controller/processor 280 of UE 120, and/or any other component(s) of FIG. 2 may perform one or more techniques associated with dual connectivity mode optimization, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 40) of FIG. 4, and/or other processes as described herein. In some aspects, executing instructions may include running the instructions, converting the instructions, compiling the instructions, and/or interpreting the instructions, among other examples.

In some aspects, a UE may include means for measuring a parameter associated with a secondary cell group; and/or means for performing an optimization response action for a dual connectivity mode of a first frequency parameter or a second frequency parameter when the parameter satisfies a threshold, wherein the optimization response action is associated with whether the secondary cell group is operating with the first frequency parameter or the second frequency parameter. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above. FIG. 2 is provided as an example. Other examples may differ from what is described with regard to FIG. 2.

In some communications systems, a UE 120 may include a dual connectivity mode that enables improved coverage and/or throughput for UE 120. For example, UE 120 may obtain connectivity on a plurality of cells on one or more frequency bands, such as a primary cell on a first frequency band (e.g., FR1), a secondary cell on the first frequency band, a primary cell on a second frequency band (e.g., FR2), a secondary cell on the second frequency band, and/or the like. However, using a dual connectivity mode may result in excess use of power resources when the UE is experiencing less than a threshold throughput or another scenario. The UE may determine that a static threshold is satisfied across all frequency bands and may disable a dual connectivity mode, such as an Evolved Universal Mobile Telecommunications System Terrestrial Radio Access (E-UTRA) NR dual connectivity (ENDC) mode, an NR dual connectivity (NRDC) mode, and/or the like. In this case, the UE may forgo reporting NR measurement results, fail a primary secondary cell add procedure, release a secondary cell group, and/or the like to reduce power consumption.

However, using a single static threshold across all frequency bands may result in situations where a dual connectivity mode is disabled on a frequency band despite a need for the dual connectivity mode still existing on that frequency band. On the other hand, in some cases, the dual connectivity mode may remain enabled on a frequency band despite a lack of a need for the dual connectivity mode. For example, a reliability characteristic on FR1 may result in greater amounts of network traffic on FR1 than on FR2. As a result, a single throughput threshold may not be satisfied by FR1 or a combination of FR1 and FR2 but may be satisfied by FR2 only. In this case, maintaining dual connectivity on FR2 may result in an unnecessary utilization of power resources.

Some aspects described herein enable frequency band specific thresholds for dual connectivity mode operation. For example, a UE may check network characteristics, such as a throughput, for one or more cells on FR1 against a first threshold and network characteristics for one or more cells on FR2 against a second threshold. In this case, based at least in part on whether respective thresholds are satisfied, the UE may perform an optimization response action, such as disabling dual connectivity, on a corresponding frequency band. In this way, the UE improves dual connectivity mode operation by enabling greater power savings, reduced likelihood of lost connectivity resulting from unnecessarily ending dual connectivity mode, and/or the like.

Figure 3:
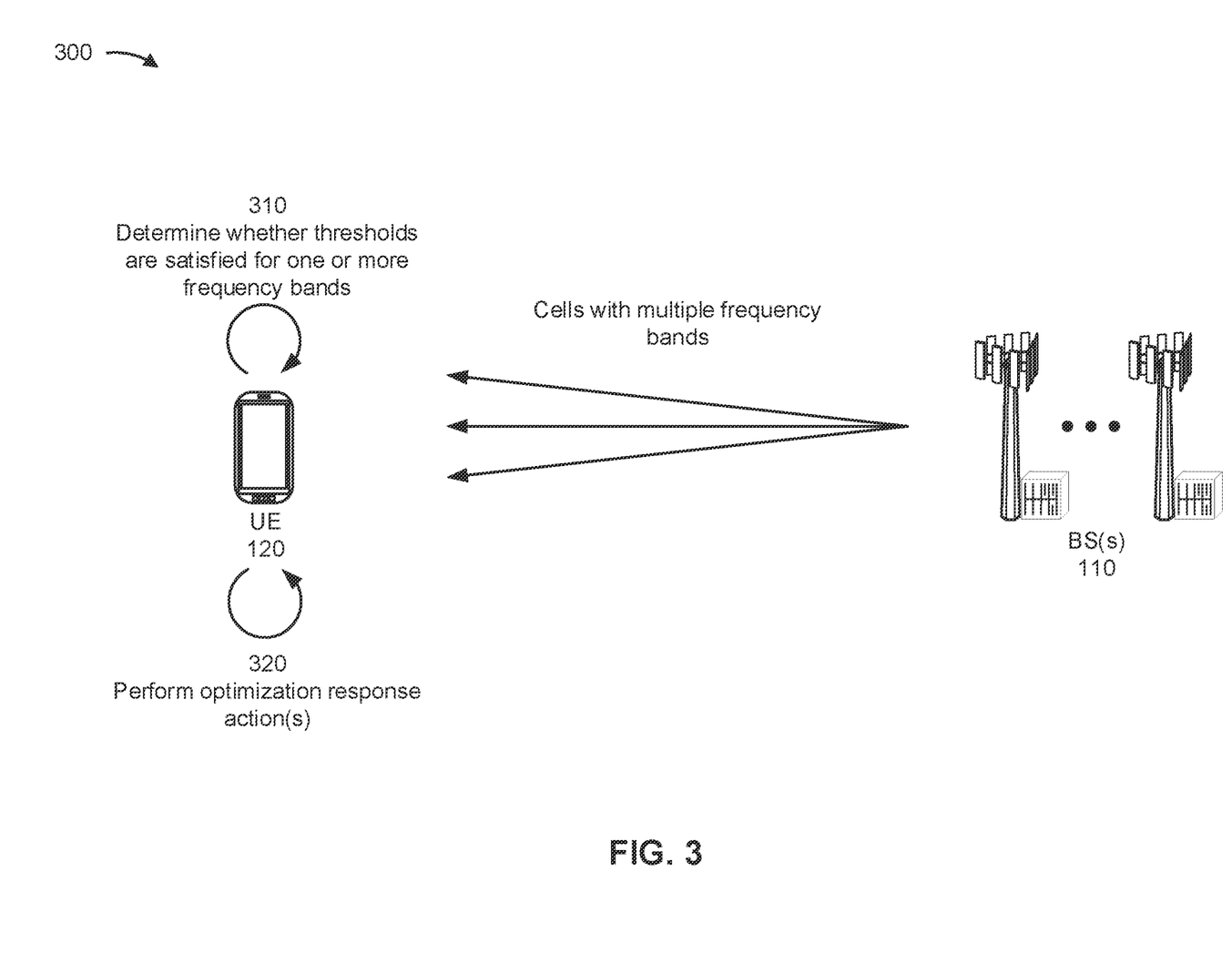
FIG. 3 is a diagram illustrating an example associated with dual connectivity mode optimization, in accordance with the present disclosure.

FIG. 3 is a diagram illustrating an example 300 associated with dual connectivity mode operation, in accordance with various aspects of the present disclosure. As shown in FIG. 3, example 300 includes a UE 120 and one or more BSs 110 providing cells across frequency bands, such as a first cell on an FR1 frequency band, a second cell on an FR2 frequency band, and/or the like.

As further shown in FIG. 3, and by reference number 310. UE 120 may determine whether one or more thresholds are satisfied for one or more frequency bands. For example, UE 120 may measure a first cell or a second cell and determine whether a first threshold is satisfied for a first cell on the FR1 frequency band, whether a second threshold is satisfied for a second cell on the FR2 frequency band, and/or the like. In this way, UE 120 may determine whether to perform an optimization response action, as described herein, separately for each frequency band.

In some aspects, UE 120 may determine whether a threshold is satisfied for a throughput metric. For example UE 120 may measure an average throughput for FR1 (to compare with a threshold for FR1), an average throughput for FR2 (to compare with a threshold for FR2, that may be different than the threshold for FR1), and/or the like. In some aspects, a characteristic of the throughput may be based at least in part on whether the throughput is for FR1 or FR2. For example, UE 120 may determine a throughput for FR1 using a first sampling time (e.g., a first byte count per sampling time) and a throughput for FR2 using a second sampling time (e.g., a second byte count per sampling time, where the sampling time differs for FR1 and FR2). Additionally, or alternatively, UE 120 may use different filtering constants for averaging the throughput when averaging the throughput for FR1 or FR2. For example, UE 120 may use slower filtering for FR1 relative to FR2. In this case, UE 120 may use an infinite impulse response (IIR) filter in an LTE radio resource control (RRC) connected mode, such that the filtering may be represented by an equation of the form:

$$A(n)=a*s(n)+(1-a)*A(n-1) \quad (1)$$

where A(n) is the IIR filter throughput, n is an index of sample, s(n) is a sampling throughput over time, and a is a constant. In this case, by using a smaller filtering constant, UE 120 may operate a filter more slowly for obtaining throughput samples.

In some aspects, UE 120 may determine whether another parameter of UE 120 satisfies a threshold criterion to determine whether to disable a dual-connectivity mode. For example UE 120 may determine to disable the dual-connectivity mode for FR1 when a throughput threshold is satisfied for FR1 and when, for example, a display of UE 120 is off.

As further shown in FIG. 3, and by reference number 320, UE 120 may perform one or more optimization response actions. For example, when an average throughput for FR 1 is less than a threshold for FR1. UE 120 may disable a dual connectivity mode. In this case, as an optimization response action, UE 120 may refrain from reporting an NR measurement of FR1 in an LTE connected mode or in ENDC. Additionally, or alternatively, UE 120 may fail (e.g., reject) a primary secondary cell add procedure or an ENDC add procedure on FR1. Additionally, or alternatively. UE 120 may release a secondary cell group on FR1 by sending a secondary cell group failure information message to BS 110 (e.g., if UE 120 is already in ENDC mode). Similarly, when an average throughput for FR2 is less than a threshold for FR2, UE 120 may disable a dual connectivity mode for FR2 and may forgo reporting of an NR measurement on FR2, fail an add procedure on FR2, release a secondary cell on FR2, and/or the like.

In some aspects. UE 120 may select an optimization response action based at least in part on a number of iterations of disabling a dual connectivity mode. For example, UE 120 may track a number of instances of failing ENDC add and/or releasing secondary cell group, and may select different optimization response actions based at least in part on the number during a period of time or during a connection time. As an example, when the number is greater than or equal to a first value, UE 120 may fail an ENDC add and release a secondary cell group connection. Similarly, when the number is greater than or equal to a second value, UE 120 may disable ENDC (e.g., may fail an ENDC add, release a secondary cell group connection, forgo reporting of an NR measurement, and/or the like). Similarly, when the number is greater than or equal to a third value, UE 120 may fail an ENDC add and release a secondary cell group connection for a specified time interval. Similarly, when the number is greater than or equal to a fourth value. UE 120 may disable ENDC for a specified time interval. Additionally, or alternatively, depending on the values, UE 120 may transmit a null measurement report. In some aspects, the aforementioned values may be the same or different for FR1 and FR2.

As indicated above. FIG. 3 is provided as an example. Other examples may differ from what is described with respect to FIG. 3.

Figure 4:
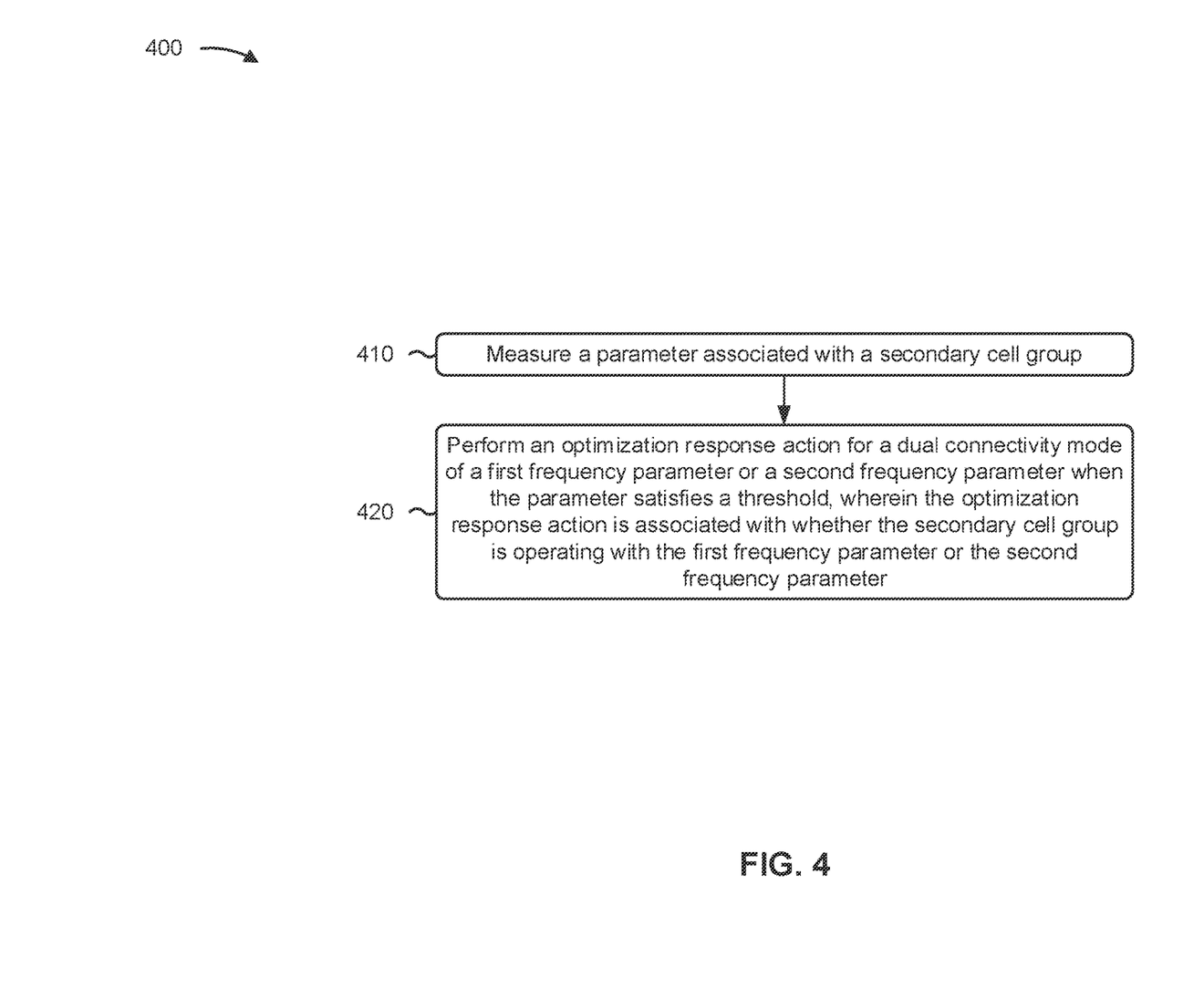
FIG. 4 is a diagram illustrating an example process associated with dual connectivity mode optimization, in accordance with the present disclosure.

FIG. 4 is a diagram illustrating an example process 400 performed, for example, by a UE, in accordance with the present disclosure. Example process 400 is an example where the UE (e.g., UE 120) performs operations associated with dual connectivity mode optimization.

As shown in FIG. 4, in some aspects, process 400 may include measuring a parameter associated with a secondary cell group (block 410). For example, the UE (e.g., using communication manager 140 and/or measurement component 508, depicted in FIG. 5) may measure a parameter associated with a secondary cell group, as described above.

As further shown in FIG. 4, in some aspects, process 400 may include performing an optimization response action for a dual connectivity mode of a first frequency parameter or a second frequency parameter when the parameter satisfies a threshold, wherein the optimization response action is associated with whether the secondary cell group is operating with the first frequency parameter or the second frequency parameter (block 420). For example, the UE (e.g., using communication manager 140 and/or response performance component 510, depicted in FIG. 5) may perform an optimization response action for a dual connectivity mode of a first frequency parameter or a second frequency parameter when the parameter satisfies a threshold, wherein the optimization response action is associated with whether the secondary cell group is operating with the first frequency parameter or the second frequency parameter, as described above.

Process 400 may include additional aspects, such as any single aspect or any combination of aspects described below and/or in connection with one or more other processes described elsewhere herein.

In a first aspect, process 400 includes determining whether the secondary cell group operates with the first frequency parameter or the second frequency parameter, wherein the frequency parameter is a frequency band or a frequency range.

In a second aspect, alone or in combination with the first aspect, a characteristic of the parameter or the threshold is associated with whether the secondary cell group operates with the first frequency parameter or the second frequency parameter.

In a third aspect, alone or in combination with one or more of the first and second aspects, the parameter is an average throughput, and wherein the characteristic of the parameter or the threshold is at least one of a sampling time of the average throughput, a filter constant applied to the average throughput, or a magnitude of the threshold.

In a fourth aspect, alone or in combination with one or more of the first through third aspects, the optimization response action includes at least one of refraining from transmission of measurement reporting, failing a primary secondary cell dual connectivity mode add procedure, releasing a secondary cell, or transmitting a secondary cell failure information message.

In a fifth aspect, alone or in combination with one or more of the first through fourth aspects, the parameter is a UE utilization parameter relating to whether a display of the UE is turned on.

In a sixth aspect, alone or in combination with one or more of the first through fifth aspects, the dual connectivity mode is an ENDC mode.

In a seventh aspect, alone or in combination with one or more of the first through sixth aspects, a type of the optimization response action is associated with a number or type of other optimization response actions performed within a period of time or connection time.

In an eighth aspect, alone or in combination with one or more of the first through seventh aspects, the first frequency parameter is a first frequency range in a sub 6 GHz frequency range and the second frequency parameter is in a frequency range in a millimeter wave frequency range.

In a ninth aspect, alone or in combination with one or more of the first through eighth aspects, the dual connectivity mode is an NRDC mode.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
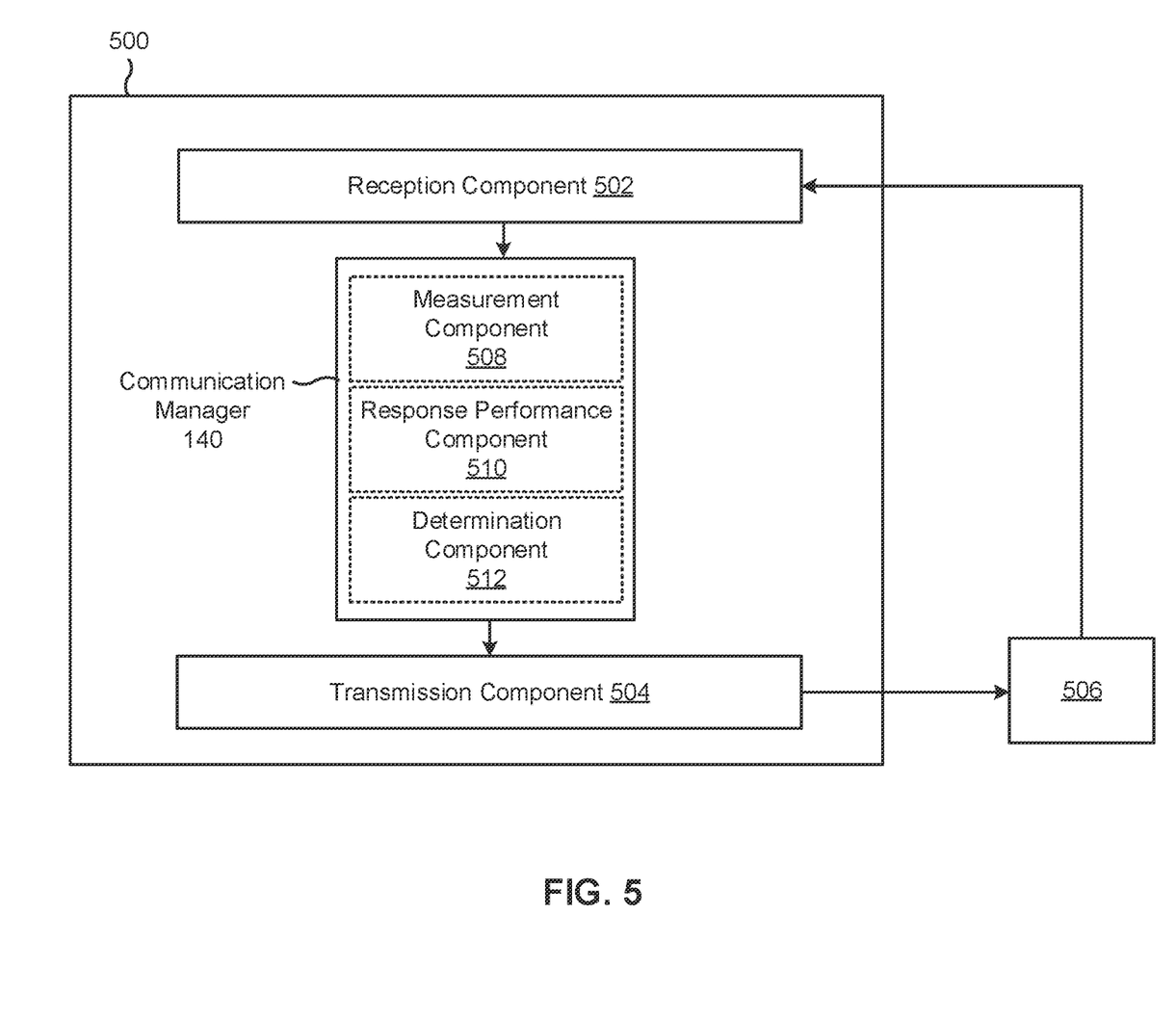
FIG. 5 is a block diagram of an example apparatus for wireless communication, in accordance with the present disclosure.

FIG. 5 is a block diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include the communication manager 140. The communication manager 140 may include one or more of a measurement component 508, a response performance component 510, or a determination component 512, among other examples.

In some aspects, the apparatus 500 may be configured to perform one or more operations described herein in connection with FIG. 3. Additionally, or alternatively, the apparatus 500 may be configured to perform one or more processes described herein, such as process 400 of FIG. 4 or a combination thereof. In some aspects, the apparatus 500 and/or one or more components shown in FIG. 5 may include one or more components of the UE described in connection with FIG. 2. Additionally, or alternatively, one or more components shown in FIG. 5 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a demodulator, a MIMO detector, a receive processor, a controller/processor, a memory, or a combination thereof, of the UE described in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described in connection with FIG. 2. In some aspects, the transmission component 504 may be co-located with the reception component 502 in a transceiver.

The measurement component 508 may measure a parameter associated with a secondary cell group. The response performance component 510 may perform an optimization response action for a dual connectivity mode of a first frequency parameter or a second frequency parameter when the parameter satisfies a threshold, wherein the optimization response action is associated with whether the secondary cell group is operating with the first frequency parameter or the second frequency parameter.

The determination component 512 may determine whether the secondary cell group operates with the first frequency parameter or the second frequency parameter, wherein the frequency parameter is a frequency band or a frequency range.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a user equipment (UE), comprising: measuring a parameter associated with a secondary cell group; and performing an optimization response action for a dual connectivity mode of a first frequency parameter or a second frequency parameter when the parameter satisfies a threshold, wherein the optimization response action is associated with whether the secondary cell group is operating with a first frequency parameter or a second frequency parameter.

Aspect 2: The method of Aspect 1, further comprising: determining whether the secondary cell group operates with the first frequency parameter or the second frequency parameter, wherein the frequency parameter is a frequency band or a frequency range.

Aspect 3: The method of any of Aspects 1 to 2, wherein a characteristic of the parameter or the threshold is associated with whether the secondary cell group operates with the first frequency parameter or the second frequency parameter.

Aspect 4: The method of any of Aspects 1 to 3, wherein the parameter is an average throughput, and wherein the characteristic of the parameter or the threshold is at least one of: a sampling time of the average throughput, a filter constant applied to the average throughput, or a magnitude of the threshold.

Aspect 5: The method of any of Aspects 1 to 4, wherein the optimization response action includes at least one of: refraining from transmission of measurement reporting, failing a primary secondary cell dual connectivity mode add procedure, releasing a secondary cell, or transmitting a secondary cell failure information message.

Aspect 6: The method of any of Aspects 1 to 5, wherein the parameter is a UE utilization parameter relating to whether a display of the UE is turned on.

Aspect 7: The method of any of Aspects 1 to 6, wherein the dual connectivity mode is an Evolved Universal Mobile Telecommunications System Terrestrial Radio Access (E-UTRA)-New Radio (NR) dual connectivity (ENDC) mode.

Aspect 8: The method of any of Aspects 1 to 7, wherein a type of the optimization response action is associated with a number or type of other optimization response actions performed within a period of time or connection time.

Aspect 9: The method of any of Aspects 1 to 8, wherein the first frequency parameter is a first frequency range in a sub 6 gigahertz (GHz) frequency range and the second frequency parameter is in a frequency range in a millimeter wave frequency range.

Aspect 10: The method of any of Aspects 1 to 9, wherein the dual connectivity mode is a New Radio (NR) dual connectivity (NRDC) mode.

Aspect 11: An apparatus for wireless communication at a device, comprising a processor, memory coupled with the processor, and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or am other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   establishing a first communication link using a first frequency band;
   establishing a second communication link using a second frequency band;
   determining whether a first threshold is satisfied for the first frequency band;
   determining whether a second threshold is satisfied for the second frequency band;
   performing a first optimization response action for disabling a dual connectivity mode for the first frequency band based on the first threshold being satisfied for the first frequency band; and
   performing a second optimization response action for maintaining the dual connectivity mode for the second frequency band based on the second threshold being satisfied for the second frequency band, the second threshold being different than the first threshold.

2. The method of claim 1, further comprising:
   determining whether a secondary cell group operates with the first frequency band.

3. The method of claim 1, wherein a characteristic of the first threshold is associated with whether a secondary cell group operates with the first frequency band.

4. The method of claim 3,
   wherein the characteristic of the first threshold is at least one of:
   a sampling time of an average throughput,
   a filter constant applied to the average throughput, or
   a magnitude of the first threshold.

5. The method of claim 1, wherein the dual connectivity mode is an Evolved Universal Mobile Telecommunications System Terrestrial Radio Access (E-UTRA)-New Radio (NR) dual connectivity (ENDC) mode.

6. The method of claim 1, wherein a type of the first optimization response action is associated with a number or type of other optimization response actions performed within a period of time or connection time.

7. The method of claim 1, wherein;
   the first frequency band is in a sub 6 gigahertz (GHz) frequency range and the second frequency band is in a millimeter wave frequency range, or
   the first frequency band is in the millimeter wave frequency range and the second frequency band is in the sub 6 GHz frequency range.

8. The method of claim 1, wherein the dual connectivity mode is a New Radio (NR) dual connectivity (NRDC) mode.

9. The method of claim 1, wherein:
   the first frequency band is a first frequency range (FR1) and the second frequency band is a second frequency range (FR2), or
   the first frequency band is the FR2 and the second frequency band is the FR1.

10. The method of claim 1, wherein determining the first threshold is satisfied comprises:
    determining whether the first threshold is satisfied for a first primary cell or a first secondary cell on the first frequency band, and
    wherein determining whether the second threshold is satisfied comprises:
    determining whether the second threshold is satisfied for a second primary cell or a second secondary cell on the second frequency band.

11. A user equipment (UE) for wireless communication, comprising:
    one or more memories; and
    one or more processors, coupled to the memories, configured to:
    establish a first communication link using a first frequency band;
    establish a second communication link using a second frequency band;
    determine whether a first threshold is satisfied for the first frequency band;
    determine whether a second threshold is satisfied for the second frequency band;
    perform a first optimization response action for disabling a dual connectivity mode for the first frequency band based on the first threshold being satisfied for the first frequency band; and
    perform a second optimization response action for maintaining the dual connectivity mode for the second frequency band based on the second threshold being satisfied for the second frequency band, the second threshold being different than the first threshold.

12. The UE of claim 11, wherein the one or more processors are further configured to:
    determine whether a secondary cell group operates with the first frequency band.

13. The UE of claim 11, wherein a characteristic of the first threshold is associated with whether a secondary cell group operates with the first frequency band.

14. The UE of claim 13,
    wherein the characteristic of the first threshold is at least one of:
    a sampling time of an average throughput,
    a filter constant applied to the average throughput, or
    a magnitude of the first threshold.

15. The UE of claim 11, wherein the dual connectivity mode is an Evolved Universal Mobile Telecommunications System Terrestrial Radio Access (E-UTRA)-New Radio (NR) dual connectivity (ENDC) mode.

16. The UE of claim 11, wherein a type of the first optimization response action is associated with a number or type of other optimization response actions performed within a period of time or connection time.

17. The UE of claim 11, wherein:
    the first frequency band is in a sub 6 gigahertz (GHz) frequency range and the second frequency band is in a millimeter wave frequency range, or
    the first frequency band is in the millimeter wave frequency range and the second frequency band is in the sub 6 GHz frequency range.

18. The UE of claim 11, wherein the dual connectivity mode is a New Radio (NR) dual connectivity (NRDC) mode.

19. The UE of claim 11, wherein the one or more processors are further configured to:
    perform one or more other optimization response actions when the first threshold is satisfied.

20. The UE of claim 19, wherein the first optimization response action is different than the second optimization response action.

21. The UE of claim 11, wherein the first optimization response action is performed further based on a number of iterations of a previous action.

22. The UE of claim 11, wherein:
the first frequency band is a first frequency range (FR1) and the second frequency band is a second frequency range (FR2), or
the first frequency band is the FR2 and the second frequency band is the FR1.

23. The UE of claim 11, wherein, to determine the first threshold is satisfied, the one or more processors are configured to:
determine whether the first threshold is satisfied for a first primary cell or a first secondary cell on the first frequency band, and
wherein, to determine whether the second threshold is satisfied, the one or more processors are configured to:
determine whether the second threshold is satisfied for a second primary cell or a second secondary cell on the second frequency band.

24. The UE of claim 11,
wherein, to perform the first optimization response action and the second optimization response action, the one or more processors are configured to:
perform the first optimization response action separately for the first frequency band, and
perform the second optimization response action separately for the second frequency band.

25. A non-transitory computer-readable medium storing a set of instructions for wireless communication, the set of instructions comprising:
one or more instructions that, when executed by one or more processors of a user equipment (UE), cause the UE to:
establish a first communication link using a first frequency band;
establish a second communication link using a second frequency band;
determine whether a first threshold is satisfied for the first frequency band;
determine whether a second threshold is satisfied for the second frequency band;
perform a first optimization response action for disabling a dual connectivity mode for the first frequency band based on the first threshold being satisfied for the first frequency band; and
perform a second optimization response action for maintaining the dual connectivity mode for the second frequency band based on the second threshold being satisfied for the second frequency band, the second threshold being different than the first threshold.

26. The non-transitory computer-readable medium of claim 25, wherein the one or more instructions further cause the UE to:
determine whether a secondary cell group operates with the first frequency band.

27. The non-transitory computer-readable medium of claim 25, wherein a characteristic of the first threshold is associated with whether a secondary cell group operates with the first frequency band.

28. The non-transitory computer-readable medium of claim 27,
wherein the characteristic of the first threshold is at least one of:
a sampling time of an average throughput,
a filter constant applied to the average throughput, or
a magnitude of the first threshold.

29. The non-transitory computer-readable medium of claim 25, wherein:
the first frequency band is in a sub 6 gigahertz (GHz) frequency range and the second frequency band is in a millimeter wave frequency range, or
the first frequency band is in the millimeter wave frequency range and the second frequency band is in the sub 6 GHz frequency range.

30. An apparatus for wireless communication, comprising:
means for establishing a first communication link using a first frequency band;
means for establishing a second communication link using a second frequency band;
means for determining whether a first threshold is satisfied for the first frequency band;
means for determining whether a second threshold is satisfied for the second frequency band;
means for performing a first optimization response action for disabling a dual connectivity mode for the first frequency band based on the first threshold being satisfied for the first frequency band; and
means for performing a second optimization response action for maintaining the dual connectivity mode for the second frequency band based on the second threshold being satisfied for the second frequency band, the second threshold being different than the first threshold.

31. The apparatus of claim 30, further comprising:
means for determining whether a secondary cell group operates with the first frequency band.

32. The apparatus of claim 30, wherein a characteristic of the first threshold is associated with whether a secondary cell group operates with the first frequency band.

33. The apparatus of claim 32,
wherein the characteristic of the first threshold is at least one of:
a sampling time of an average throughput,
a filter constant applied to the average throughput, or
a magnitude of the first threshold.

34. The apparatus of claim 30, wherein:
the first frequency band is in a sub 6 gigahertz (GHz) frequency range and the second frequency band is in a millimeter wave frequency range, or
the first frequency band is in the millimeter wave frequency range and the second frequency band is in the sub 6 GHz frequency range.

* * * * *